(12) United States Patent
Broome

(10) Patent No.: US 7,729,029 B2
(45) Date of Patent: Jun. 1, 2010

(54) OPTICAL SCAN ENGINE USING ROTATING MIRROR SECTORS

(75) Inventor: Barry G. Broome, Carlsbad, CA (US)

(73) Assignee: Reliant Technologies, Inc., Mountain View, CA (US)

( * ) Notice: Subject to any disclaimer, the term of this patent is extended or adjusted under 35 U.S.C. 154(b) by 280 days.

(21) Appl. No.: 12/113,759

(22) Filed: May 1, 2008

(65) Prior Publication Data

US 2008/0273231 A1 Nov. 6, 2008

Related U.S. Application Data

(60) Provisional application No. 60/915,393, filed on May 1, 2007.

(51) Int. Cl.
  *G02B 26/08* (2006.01)
(52) U.S. Cl. .................................. 359/203.1; 359/201.2
(58) Field of Classification Search ............... 359/203.1
  See application file for complete search history.

(56) References Cited

U.S. PATENT DOCUMENTS

| 3,845,298 A | 10/1974 | Runciman |
| 4,413,878 A * | 11/1983 | Lettington ............... 359/203.1 |
| 4,606,601 A | 8/1986 | Starkweather |
| 4,623,251 A | 11/1986 | Pouey |
| 4,796,038 A | 1/1989 | Allen et al. |
| 5,646,764 A | 7/1997 | Moore et al. |
| 5,774,569 A | 6/1998 | Waldenmaier |
| 2004/0032631 A1 | 2/2004 | Amada et al. |
| 2005/0285928 A1 | 12/2005 | Broome et al. |

OTHER PUBLICATIONS

PCT International Search Report and Written Opinion, PCT/US08/62292, Aug. 8, 2008, 8 pages.
PCT International Search Report and Written Opinion, PCT/US08/62298, Aug. 6, 2008, 7 pages.

* cited by examiner

*Primary Examiner*—James Phan
(74) *Attorney, Agent, or Firm*—Wood, Herron & Evans, LLP

(57) ABSTRACT

An optical scan engine includes a rotatable component, for example a disk or drum. The rotatable component includes a plurality of scan sectors that are arranged around the rotation axis and that lie substantially in a plane of rotation. Each scan sector includes a pair of reflective surfaces that typically are radially-facing. The incident optical beam typically propagates along a radial direction (e.g., towards the rotation axis) and each pair of reflective surfaces deflects the incident optical beam by approximately 180 degrees as that pair rotates through the incident optical beam. The deflected optical beam has a virtual image located on the rotation axis. As a result, the real image of the deflected optical beam rotates around the rotation axis at the same angular velocity as the scan sectors. Different scan sectors can be designed to yield different deflections in the axial direction. The addition of a third reflective surface to each scan sector can be used to generate image points that are fixed in space as the scan sector rotates.

19 Claims, 4 Drawing Sheets

OPTICAL SCAN ENGINE USING ROTATING MIRROR SECTORS

CROSS-REFERENCE TO RELATED APPLICATION(S)

This application claims priority under 35 U.S.C. §119(e) to U.S. Provisional Patent Application Ser. No. 60/915,393, "Optical Scan Engine Using Rotating Mirror Sectors," filed May 1, 2007 by Barry G. Broome. The subject matter of all of the foregoing is incorporated herein by reference in their entirety.

BACKGROUND OF THE INVENTION

1. Field of the Invention

This invention relates generally to optically scanning and/or optically generating a pattern of figures such as arrays of image points, spots, or lines. More particularly, this invention relates to scanning and/or generating such patterns using a single rotating component that has sets of typically either two or three reflective surfaces that deflect an incident optical beam by various amounts.

2. Description of the Related Art

Optical scanners are a very mature technology and are most frequently represented by galvanometric scanners that oscillate a single mirror across an entry beam, or by a polygon scanner that has multiple reflective facets which are sequentially rotated through the entry beam. Galvanometric scanners have the disadvantage that they must be operated at low angular velocities to achieve constant displacement rates or to achieve a specific angular displacement pattern as may be required for micro-welding or medical treatment applications. Low duty cycle is another limitation of galvanometric mirror scanners because it takes substantial time to start and stop the galvanometer drive element for each point in the image array that must be addressed.

Polygon scanners operate at constant angular velocities, but they introduce a cross-scan random error associated with the machining errors on the individual facets and also due to run-out in the bearings that support the shaft of the polygon. This latter limitation is often mitigated by using expensive anamorphic relay optics to image the beam onto the facet in the cross-scan direction and more anamorphic relay optics to remove this one-dimensional power and form a round image spot. Another limitation of polygon scanners is the low duty cycle associated with a beam traversing a plurality of reflective facets.

For many optical pattern generators, the principal limitation is low duty cycle. The Broome optical pattern generator described in commonly owned, co-pending application Ser. No. 11/158,907, "Optical Pattern Generator Using A Single Rotating Component," filed Dec. 29, 2005 by Barry G. Broome et al. is noteworthy for its improved duty cycle. The Broome optical pattern generator can reach duty cycles of 50% or better. In contrast, almost all prior art optical pattern generators used galvanometer mirror devices with duty cycles well below 50%.

Another limitation of most prior art optical pattern generators is that only linear patterns can be produced easily unless two independently-driven galvanometer mirror devices are used. In that case, synchronization of the two mirror devices is required and, due to the nature of galvanometer devices, it is still difficult to generate irregular two-dimensional patterns. Another limitation of most prior art optical pattern generators is that only narrow or collimated input beams can be used unless the duty cycle becomes very low.

Thus, there is a need for optical pattern generators with better capabilities than are currently available.

SUMMARY OF THE INVENTION

The present invention overcomes the limitations of the prior art by providing an optical scan engine based on scan sectors of two reflective surfaces that rotate around a common axis of rotation. The incident optical beam and the two reflective surfaces are positioned so that the reflective surfaces deflect the optical beam to a focus that rotates around the axis of rotation at the same angular velocity as the scan sector. A third reflective surface can be added to the scan sector to generate optical patterns that do not move at the object or image field.

In certain embodiments for optical scanning, the optical scan engine includes a rotatable component, for example a disk or drum. For convenience, the terms plane of rotation, rotation axis, and radial, tangential and axial directions are defined relative to the rotatable component. The rotatable component includes a plurality of scan sectors that are arranged around the rotation axis and that lie substantially in a plane of rotation. For example, the scan sectors may be arranged in a circle centered on the rotation axis. Each scan sector includes a pair of reflective surfaces that typically are radially-facing. The incident optical beam typically propagates along a radial direction (e.g., towards the rotation axis) and each pair of reflective surfaces deflects the incident optical beam by approximately 180 degrees as that pair rotates through the incident optical beam. Without the reflective surfaces, the rest of the optical train would focus the incident optical beam at the rotation axis (i.e., the optical beam has a virtual image located on the rotation axis 4). With the reflective surfaces, the focus is deflected away from the rotation axis to a point that rotates around the rotation axis with the same angular velocity as the scan sector.

The reflective pairs are not required to all be identical. In this way, different scan sectors can generate different scan geometries. For example, tilting a two-mirror pair and also changing the included angle between two mirrors can be used to offset the scan geometry along the height of an object or of an image while producing telecentricity. If only the included angle is changed for each scan sector, the scan geometry is offset but it is not telecentric. Multiple incident optical beams can also be used, for example to increase the throughput of the device.

The optical scan engine can be used in many different systems and for many different applications. For example, if the rotating deflected beam is focused but still allowed to rotate, then each scan sector might produce a scan figure along a cylindrical image surface (e.g., a scan line moving on the cylindrical surface), with different sectors producing different scan lines or scan lines offset along the axial direction of the cylindrical surface. If the image surface rotates with the optical scan engine, then the scan line can be compressed to a stationary scan point on the rotating image surface.

In one variation, a third reflective surface can be added to each sector. This surface rotates with the other two reflective surfaces and is positioned to deflect the optical beam exiting from those surfaces to a tangential direction. Since the optical beam from the first two surfaces is rotating with the scan sector, the third surface can be used to cancel the rotation, producing an optical beam with a stable (i.e., non-rotating) direction. An imaging group can be used to focus the optical beam to a point. In this manner, the device will produce a set of stationary points as each scan sector (i.e., each three mirror set) rotates through the incident optical beam.

The optical scan engines described above have significant advantages. One advantage is that changing the included angle between reflective surfaces in a pair allows different scan sectors to project the lens axis to different points on the image surface. Another advantage is that tilting and changing the included angle for reflective pairs can be used to achieve telecentric imaging while still addressing different points on the image surface. Telecentric imaging is a useful condition when energy is launched into optical fibers or to prevent image position shift when the object distance is a variable.

Other aspects of the invention include optical pattern generators based on the scan engines described above, applications for these, and methods corresponding to all of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
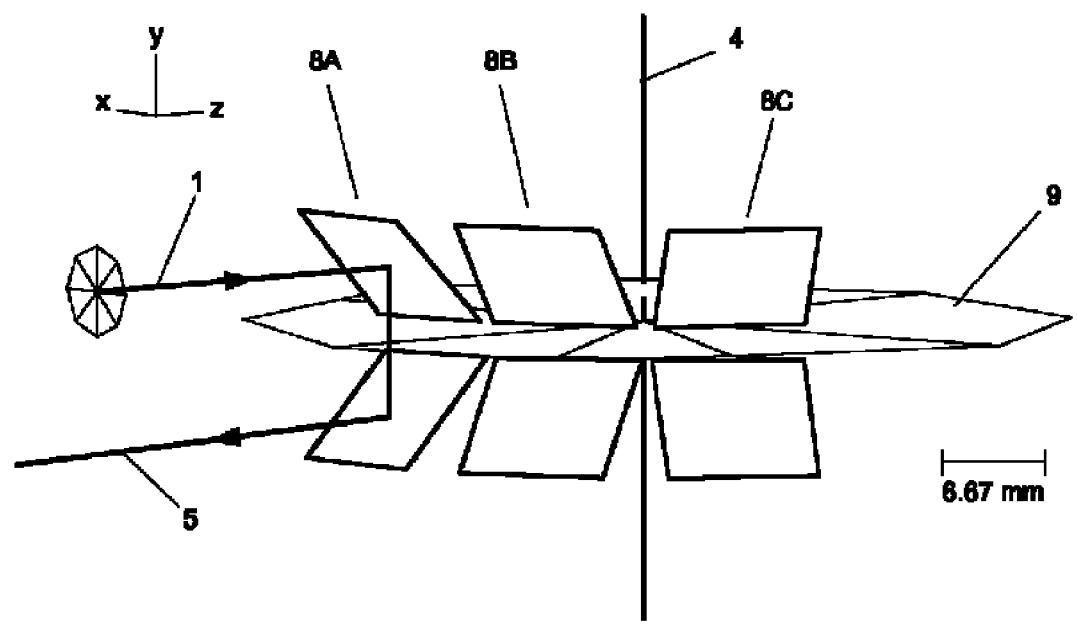
FIG. 1 is a diagram of an optical scan engine according to one embodiment of the invention.

FIG. 1 is a diagram of an optical scan engine according to the invention. In this example, a rotating component 9 (represented by a disc shape in FIG. 1 although it could have other shapes) is divided into many scan sectors 8A, 8B, 8C, etc., which are arranged in a circle centered on the rotation axis 4 of the rotating component 9. An optical beam 1 is incident on the different sectors 8 as they rotate through the beam. As the component 9 rotates, the sectors 8 rotate through the incident optical beam 1. The point where a sector 8 is mid-way through its rotation through the optical beam 1 will be referred to as the mid-rotation position or mid-rotation angle. For convenience, the terms plane of rotation, rotation axis, and radial, tangential and axial directions are defined relative to the rotatable component 9.

Each sector 8 includes a pair of reflective surfaces that are oriented along a radial direction. In this example, the reflective surfaces face radially outward. An incoming optical beam 1 propagates radially inward (i.e., towards the rotation axis 4) and is deflected by the reflective pair 8 by approximately 180 degrees. The deflected optical beam 5 therefore propagates approximately along a radially outward direction. Without the reflective surfaces, the incident optical beam 1 would have focused on the rotation axis 4. With the reflective surfaces, the optical beam 5 is deflected to a radially outward direction, thus displacing the focus away from the rotation axis 4. However, due to the geometry, the focus (or image point) of deflected optical beam 5 rotates around the rotation axis 4 with the same angular velocity as the scan sector 8.

As the disk 9 rotates to the next sector 8 and the next pair of reflective surfaces, the angular deflection along the axial direction (i.e., displacement of focus in the y direction in FIG. 1) can be changed by changing the design of the optical elements in that sector (e.g., by using a different included angle between opposing reflective surfaces). As a result, the angular deflection of the exit optical beam 5 may vary from sector to sector. Each sector 8 can produce a different angular deflection. Alternately, some sectors can produce the same angular deflection as other sectors. Different patterns of angular deflections can be achieved.

For example, the sectors 8 can be arranged around the disk 9 so that the angular deflection (i.e., y offset for the focus) increases monotonically as the disk rotates. Alternately, the angular deflections could be arranged in a sequence such that the final delivered spots are not produced in sequential order. In other words, if the pattern is an array of spots 1, 2, 3, ... 29, the sectors may be designed to generate the spots in an order other than sequentially from 1 to 29. For certain applications, producing adjacent spots within a short period of time can cause thermal coupling between the irradiated regions, and this can be deleterious to proper treatment. By arranging the reflective pairs appropriately, the spots can be delivered such that temporally successive spots are spatially separated from each other while still delivering the full pattern of spots.

Figure 2A:
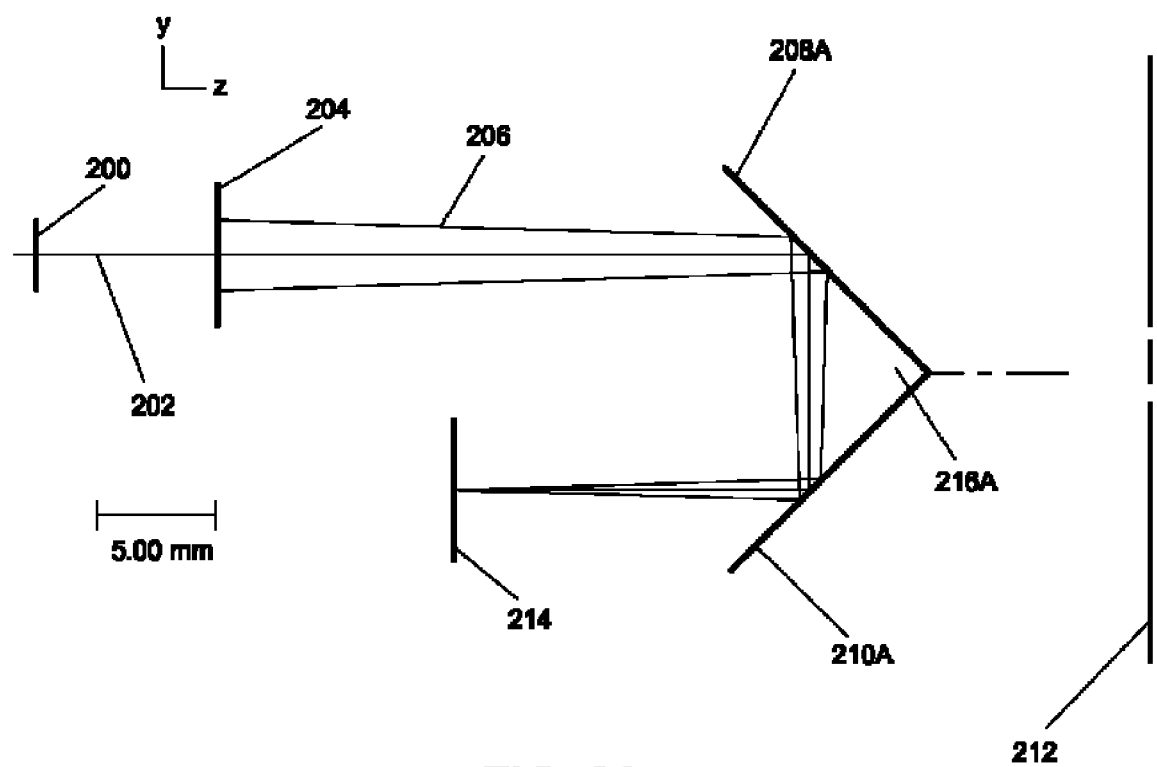
FIGS. 2A and 2B are side views of two scan sectors from an exemplary optical scan engine according to the invention.

FIGS. 2A, 2B, 3 and 4 show different scan sectors from a telecentric rotating mirror array scan engine according to the invention. FIG. 2A shows a side view of one specific scan sector. An entry optical axis 202 is shown passing through projection lens 204 to become a focused optical beam 206. Without the mirrors 208A-210A, the focused beam 206 would have focused on the rotation axis 212. Instead, the focused beam 206 is reflected by mirror 208A and subsequently by mirror 210A and is finally imaged on the image surface 214, which in this example is cylindrical and centered on rotation axis 212. The placement of imaging lens 204 before the scanner group makes this a pre-objective scanner geometry.

For the scan sector shown in FIG. 2A, the mirror pair 208A-210A has an included angle 216A of ninety degrees. In addition, the mirror pair 208A-210A is not tilted with respect to the plane of rotation. That is, the bisector of included angle 216A is perpendicular to the rotation axis 212. As a result, the entry optical axis 202 is folded by exactly 180 degrees and is incident at the center of the image surface 214 (with respect to the y-direction). The focus on the image surface 214 rotates around the optical axis 212 with the same angular velocity as the mirrors 208A-210A. In a preferred embodiment, the image surface 214 rotates with the mirror pair, so that this geometry produces a virtual image of the image surface 214 that appears to lie on the rotation axis 212, thus preventing the image from moving laterally as the scan engine rotates. In other words, the focus is held at the same spot on image surface 214 since the surface rotates with the focus.

Figure 2B:
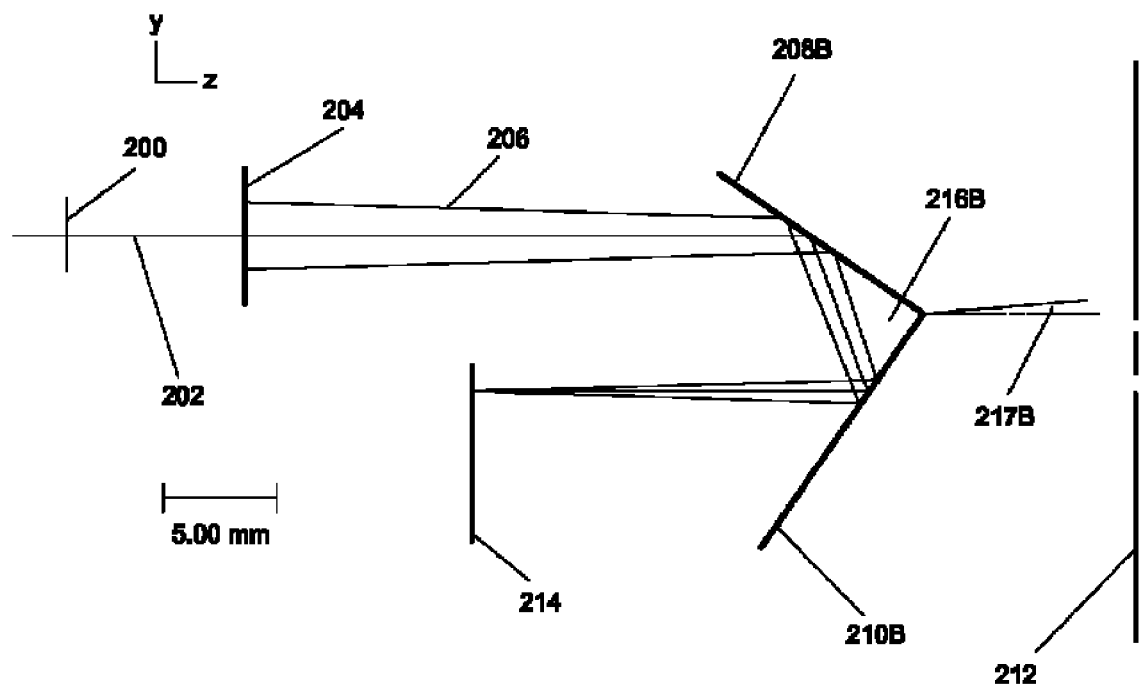

FIG. 2B shows a side view of another scan sector. In this case, mirrors 208B and 210B have a different included angle 216B (specifically, 95 degrees) and the mirror pair is tilted 217B in the plane of the drawing such that the focused beam 206 comes to a telecentric focus at an off-axial point of image surface 214. Telecentric imaging is defined as the condition where the chief ray of a ray bundle (the ray at the center of the ray bundle) is parallel to the optical axis as the axis penetrates the image surface. Again, the incoming optical beam 206 would have focused on the rotation axis 212 if there were no mirrors 208B-210B. In other words, the optical path length to the rotation axis 212 is the same as the optical path length to the image surface 214.

One advantage of telecentricity is that if the object distance along input ray 202 should change due to object movement or thermal focal shift effects, the image pattern at surface 214 would not change significantly. For systems that are mapping the object space onto a film or detector array, this condition can be useful. If an array of optical fibers were placed at surface 214 and did not rotate with the mirror array scanner, the object space would be sequentially mapped onto the fiber array and the telecentric condition would be preferred to more efficiently couple energy into the fibers. For the case of a non-moving optical fiber array at surface 214, the image of object 200 will be moving at a constant rate along the columns of fibers in the array. This behavior can be used for spectrally-scanning the object space by placing appropriate filters at the output ends of the fibers where the image irradiance is detected.

Figure 3:
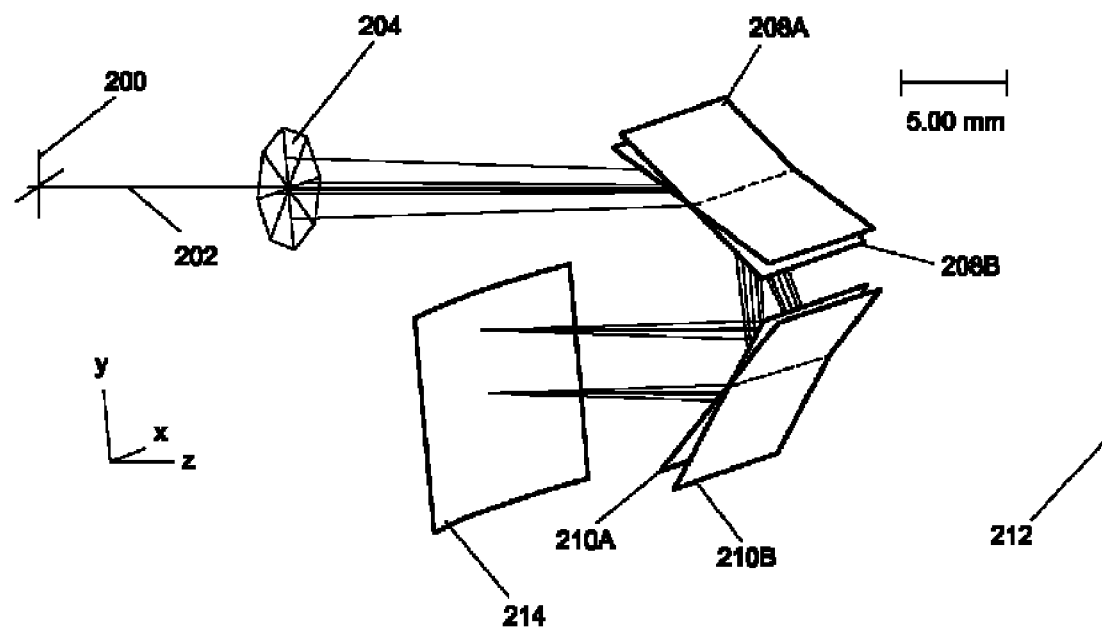
FIGS. 3 and 4 are a perspective view and top view of different scan sectors of the optical scan engine of FIG. 2.

FIG. 3 shows a perspective view of the telecentric rotating two-mirror array optical scan engine. FIG. 3 shows two sets of mirror pairs superimposed along the focused beam 206 and rotating about axis 212. Mirror pair 208A-210A images the focused beam 206 onto the center of the image surface 214. Mirror pair 208B-210B image the focused beam 206 onto the top edge of the image surface 214. In this example, each mirror pair on a rotating drum produces an image point at a different height on image surface 214. As the drum rotates and each mirror pair passes through the focused beam 206, the image point on surface 214 moves horizontally on the cylindrical image surface. If image surface 214 is not rotating, each mirror pair on the rotating drum will produce a line image on the image surface 214. If the image surface 214 is rotating at the same angular velocity as the drum, each mirror pair will produce a point image on the image surface 214. The telecentric condition in this view is observed as the chief ray of the focused beam 206 is perpendicular to image surface 214 for both mirror pairs.

Figure 4:
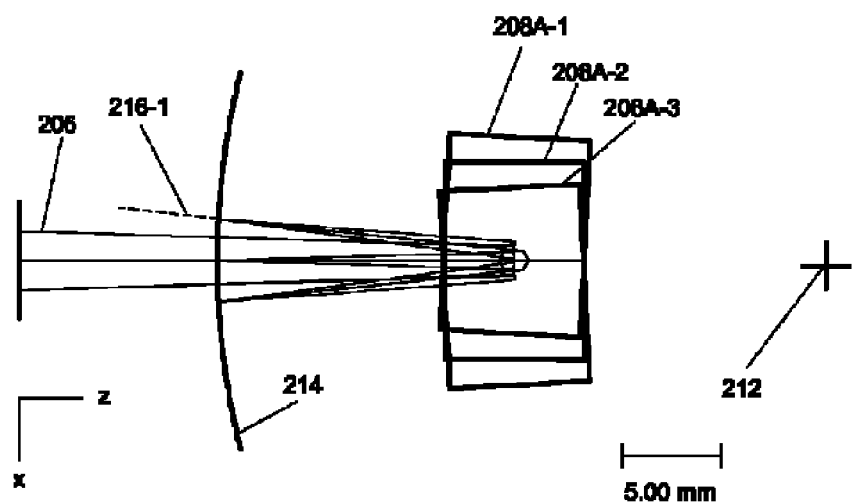

FIG. 4 shows a top view of the telecentric rotating two-mirror array optical scan engine. This view shows three positions of one mirror pair as the drum rotates about axis 212. These three rotated scanner positions are identified by mirrors 208A-1, 208A-2, and 208A-3 in sequence as the drum rotates. The image point as it moves along image surface 214 can be seen and the telecentric condition in this view is shown by the image surface perpendicular 216-1 that is coincident with the local chief ray of the focused beam 206.

Figure 5:
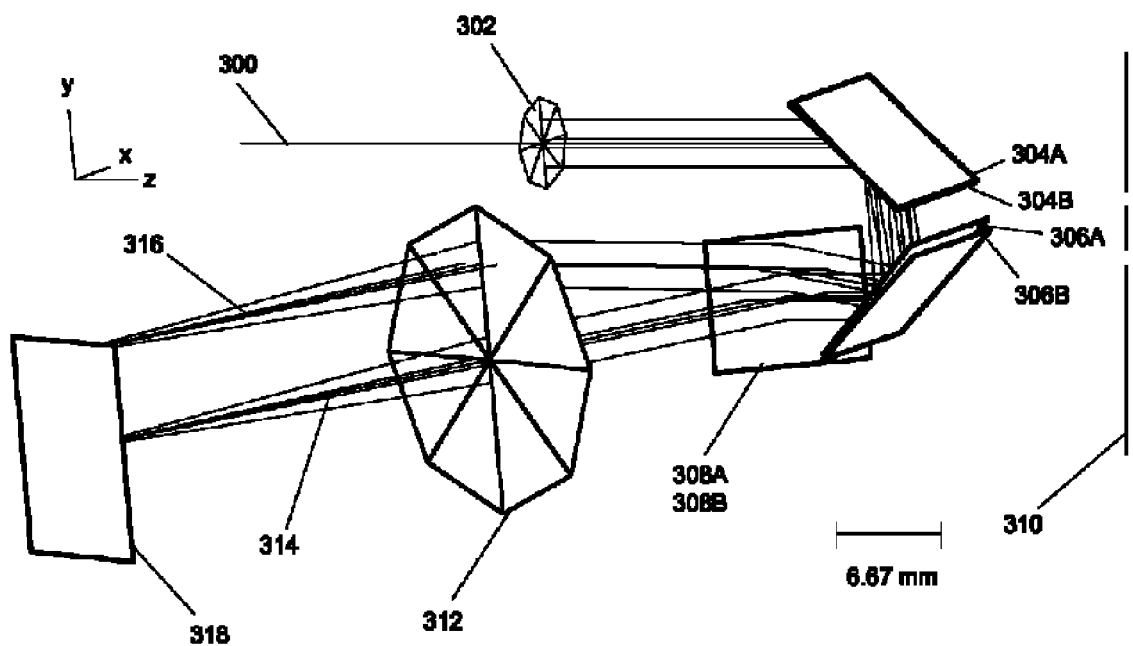
FIG. 5-7 are a perspective view, top view and side view of another optical pattern generator based on an optical scan engine according to the invention.
Figure 6:
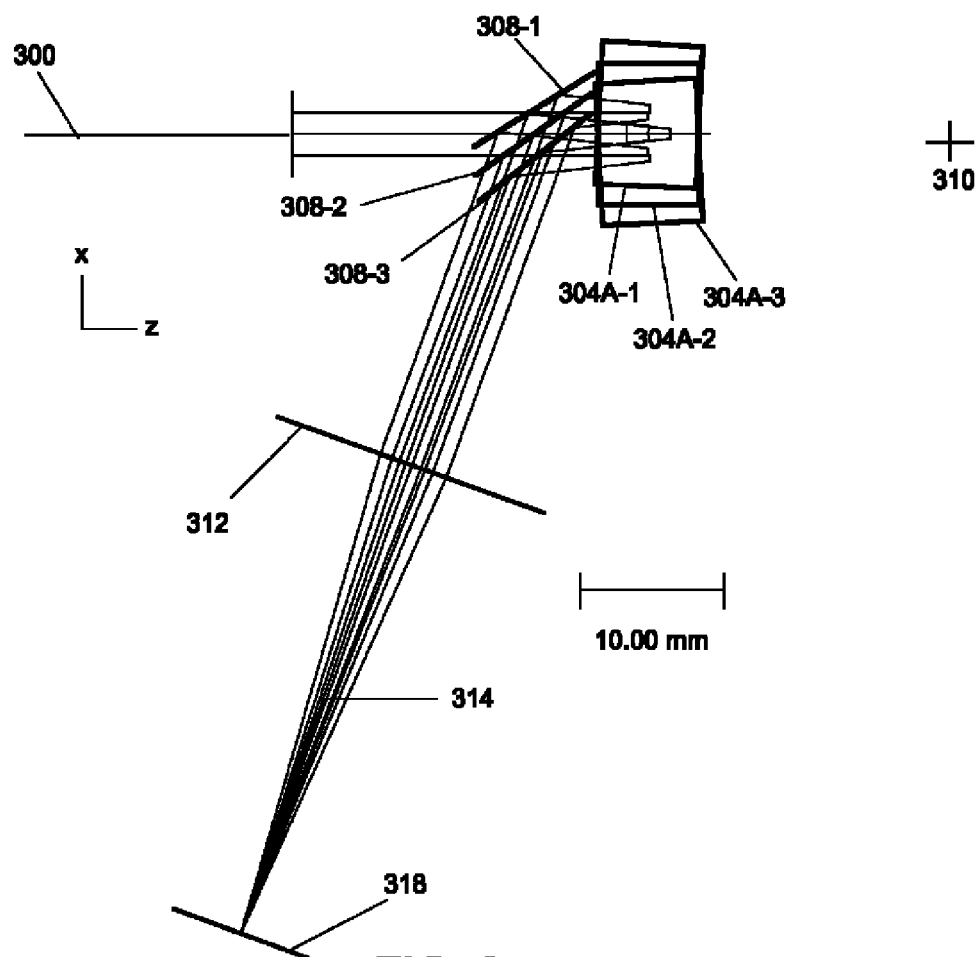
Figure 7:
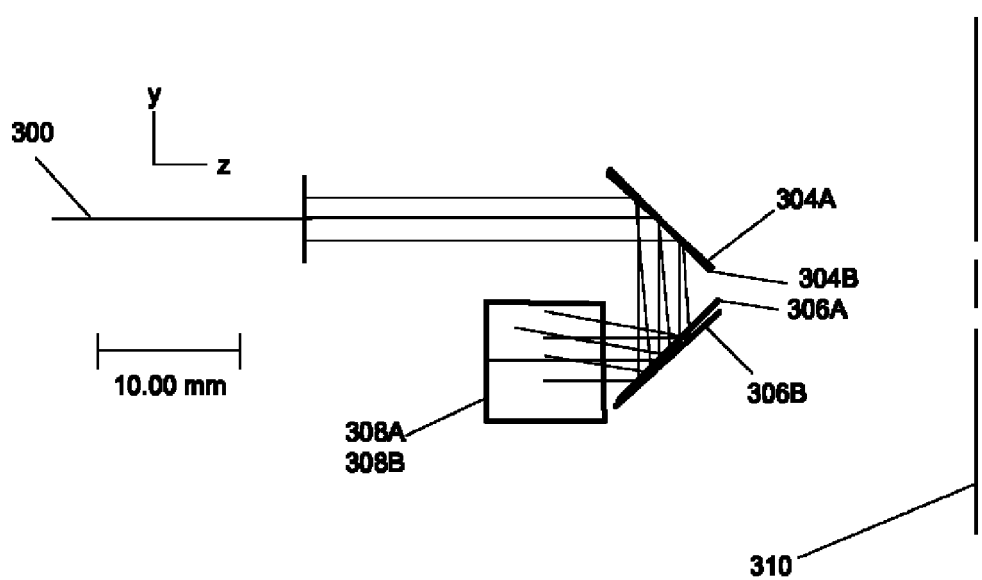

The two-mirror optical scan engine shown in FIGS. 2-4 produces scan figures along the tangential direction (e.g., a line that is scanned across the cylindrical image surface). As described above, the scan figures can be compressed to point figures if the image surface 214 is rotated with the mirror pairs. FIGS. 5-7 illustrate another approach that compresses the scan figure to point figures when the image surface 214 is not rotated with the mirror pairs. In this approach, a third mirror 308 is added to each two-mirror pair 304-306 on the rotating drum. For each scan sector, all three mirrors 304, 306 and 308 rotate about the axis 3 10.

FIG. 5 is a perspective view of the rotating three-mirror array optical pattern generator showing two different scan sectors, one producing an axial image point and the other producing an extra-axial image point. A laser or other energy source beam 300 enters at the top left and passes through the system entrance pupil 302. For the axial image point, the incident optical beam 300 subsequently reflects from mirror pair 304A-306A. The exit optical beam propagates radially outward and rotates in space as the mirror pair 304A-306A rotates about axis 310. The optical beam subsequently reflects from mirror 308A which is tilted in a plane perpendicular to the mirror pair and which is also rotating around axis 310 at the same rate as mirror pair 304A-306A. The beam incident on mirror 308A is also rotating in space and the mirror 308A exactly compensates for the beam rotation. As a result, the beam reflected from mirror 308A is angularly stable in space in both orthogonal planes of action. Lens 312 images the axial beam 314 onto the non-moving image surface 318. Due to the angular stability, the resulting figure on surface 318 is a point that is stationary even as mirror set 304A-306A-308A rotates through the incident optical beam.

For the extra-axial image point, the incident optical beam 300 reflects from mirror pair 304B-306B, analogously as described in FIGS. 2-4. The exit optical beam then reflects from mirror 308B, which in this example is positioned at the same angle as mirror 308A. Mirror 308B causes the same effect as mirror 308A, directing the optical beam to a stable point on image surface 318. The change in tilt and included angle for mirror pair 304B-306B offset the stable point in the axial direction, resulting in an extra-axial image point.

FIG. 5 shows that when mirrors 304A, 306A, and 308A are in the path of beam 300, the axial image point is produced at image surface 318 such that as these mirrors are rotated through beam 300, energy is delivered only to the axial image point, which is not moving in space. Similarly, FIG. 7 shows that when mirrors 304B, 306B, and 308B are in the path of beam 300, only the extra-axial image point is produced at image surface 318, which is not moving in space. The image spot does not move from point to point, but instead dwells on one point and then suddenly appears and dwells at a different point as different scan sectors rotate through the incident optical beam. Each set of three mirrors can produce a different image point.

FIG. 6 shows a top view of one scan sector of the rotating three-mirror array optical pattern generator, but showing three different rotation positions for the scan sector about rotation axis 310. This view shows the generation of the axial image point 314 at image surface 318. The first rotation position in FIG. 8 is identified by mirrors 304A-1 and 308-1. The second rotation position is identified by mirrors 304A-2 and 308-2. The third rotation position is identified by mirrors 304A-3 and 308-3.

FIG. 6 shows that the tilt angle of mirror 308 with respect to its neighboring mirrors 304 and 306 determines the position of the image point in this plane of action whereas the position of the image point in the orthogonal plane of action is determined by the included angle and tilt of the mirror pair 304-306. Due to this separation of image space functions, each scan sector can be designed to address any point in the two-dimensional image space 318. The resulting pattern formed as the scan sectors rotate through the incident optical beam can just as easily be irregular as regular. That is, this optical pattern generator is not limited to regular scan patterns (as is typically the case for galvanometers, for example) and can essentially provide random access to the two-dimensional image space 318.

FIG. 7 is a side view of the two scan sectors shown in FIG. 5, but showing only the optical elements from the entering beam 300 through mirror 308 for clarity. This figure shows the orthogonality condition between mirrors 304A-306A (or mirrors 304B-306B) and mirror 308A (or 308B). The three mirrors in each three-mirror set rotate as a combined unit around axis 31 0. FIG. 7 shows two different three-mirror sets so the different included angles and different tilt angles for mirrors 304A-306A and 304B-306B can be observed.

Although the detailed description contains many specifics, these should not be construed as limiting the scope of the invention but merely as illustrating different examples and aspects of the invention. It should be appreciated that the scope of the invention includes other embodiments not discussed in detail above. For example, mirrors were used in the above examples but other reflective surfaces can also be used. For example, the two- and three-mirror sets can be replaced by prisms with reflections off the reflective surfaces of the prisms.

In addition, the systems shown above can also be operated in reverse. For example, in FIGS. 2-4, an object might be provided on surface 214 and imaged onto direction 200. Many applications will be apparent. The optical scan engine can be used to scan objects for the purpose of document storage or for image projection. Document storage can take the form of a film or paper document being scanned with the encoded data detected by a single pixel or multi-pixel sensor. Film-to-digital storage can be done in this manner. Image projection can take the form of a film or digital display device being scanned onto a display screen. In addition, the optical scan engine can be used in optical pattern generators which can produce either a one-dimensional or a two-dimensional pattern of figures. Optical pattern generators can be used in micro-welding applications or in medical applications that require treatment of either one-dimensional or two-dimensional discrete regions.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An optical scan engine for scanning an incident optical beam, the optical scan engine comprising a rotatable component that defines a plane of rotation, a rotation axis, and a radial direction; the rotatable component comprising a plurality of scan sectors arranged around the rotation axis and lying substantially in the plane of rotation, each scan sector comprising a radially-facing pair of reflective surfaces; wherein each scan sector deflects the incident optical beam by approximately 180 degrees as the scan sector rotates through the incident optical beam, the deflected optical beam rotates with the scan sector and has a virtual image located on the rotation axis, and at least two of the scan sectors generate different scan figures.

2. The optical scan engine of claim 1 wherein the rotatable component contains N scan sectors that generate at least N-1 different scan figures.

3. The optical scan engine of claim 1 wherein at least two of the scan sectors generate a same scan figure.

4. The optical scan engine of claim 1 wherein each pair of reflective surfaces contains an included angle of approximately 90 degrees but at least two pairs of reflective surfaces have different included angles.

5. The optical scan engine of claim 4 wherein at least two pairs of reflective surfaces have different included angles and tilt of the bisector angle, and the scan sectors produce telecentric deflected optical beams.

6. The optical scan engine of claim 5 wherein each scan sector generates a scan figure along a tangential direction of the rotatable component, and the different included angles and tilts of the bisector angles offset the scan figure along an axial direction.

7. The optical scan engine of claim 4 wherein at least two pairs of reflective surfaces have a same included angle.

8. The optical scan engine of claim 1 further comprising:
a conjugate surface that rotates with the scan sectors, wherein each scan sector generates a scan figure that is a point on the conjugate surface.

9. The optical scan engine of claim 1 further comprising:
a stationary conjugate surface, wherein each scan sector generates a scan figure along a tangential direction of the stationary conjugate surface.

10. The optical scan engine of claim 1 wherein, when each scan sector rotates through the incident optical beam, more than one optical beam is simultaneously incident on and deflected by the scan sector.

11. The optical scan engine of claim 1 wherein the optical scan engine is for scanning at least two incident optical beams that are incident on and deflected by different scan sectors.

12. The optical scan engine of claim 1 wherein each scan sector further comprises a third reflective surface that compensates for rotation of the optical beam deflected by the radially-facing pair of reflective surfaces.

13. The optical pattern generator of claim 12 further comprising:
an imaging group positioned to focus the optical beam deflected by the third reflective surfaces to a stationary image point.

14. An optical pattern generator for generating a pattern of continuous figures from an incident optical beam, the optical pattern generator comprising:
an optical scan engine comprising a rotatable component that defines a plane of rotation, a rotation axis, and a radial direction; the rotatable component comprising a plurality of scan sectors arranged around the rotation axis and lying substantially in the plane of rotation, each scan sector comprising a radially-facing pair of reflective surfaces; wherein each scan sector deflects the incident optical beam by approximately 180 degrees as the scan sector rotates through the incident optical beam, the deflected optical beam rotates with the scan sector and has a virtual image located on the rotation axis, and at least two of the scan sectors generate different continuous scan figures; and
an imaging group positioned to focus the optical beam.

15. The optical pattern generator of claim 14 wherein each pair of reflective surfaces contains an included angle of approximately 90 degrees but at least two pairs of reflective surfaces have different included angles.

16. The optical pattern generator of claim 15 wherein at least two pairs of reflective surfaces have different included angles and tilt of the bisector angle, and the scan sectors produce telecentric deflected optical beams.

17. The optical pattern generator of claim 16 wherein each scan sector generates a scan figure along a tangential direction of the rotatable component, and the different included angles and tilts of the bisector angles offset the scan figure along an axial direction.

18. The optical pattern generator of claim 14 wherein each scan sector further comprises a third reflective surface that compensates for rotation of the optical beam deflected by the radially-facing pair of reflective surfaces.

19. The optical pattern generator of claim 18 further comprising:
an imaging group positioned to focus the optical beam deflected by the third reflective surfaces to a stationary image point.

* * * * *